(12) United States Patent  (10) Patent No.: US 8,386,417 B2
Iwasaki et al.  (45) Date of Patent: Feb. 26, 2013

(54) ELECTRONIC ALBUM PROVIDING SYSTEM AND FILE PROVIDING SYSTEM

(75) Inventors: Mayuko Iwasaki, Tokyo (JP); Tomohisa Hasumi, Kawaguchi (JP); Keita Kimura, Tokyo (JP); Shoei Nakamura, Yokohama (JP)

(73) Assignee: Nikon Corporation, Tokyo (JP)

( * ) Notice: Subject to any disclaimer, the term of this patent is extended or adjusted under 35 U.S.C. 154(b) by 1002 days.

(21) Appl. No.: 12/230,904

(22) Filed: Sep. 8, 2008

(65) Prior Publication Data

US 2009/0138533 A1 May 28, 2009

(30) Foreign Application Priority Data

Sep. 11, 2007 (JP) ................................. 2007-235157
Aug. 21, 2008 (JP) ................................. 2008-213058

(51) Int. Cl.
*G06F 17/30* (2006.01)
(52) U.S. Cl. ............................ 707/206; 713/168; 726/26
(58) Field of Classification Search .................. 713/168; 725/105; 709/203; 348/239
See application file for complete search history.

(56) References Cited

U.S. PATENT DOCUMENTS

| 6,567,983 | B1 * | 5/2003 | Shiimori ....................... 725/105 |
| 7,519,656 | B2 * | 4/2009 | Yamaguchi et al. .......... 709/203 |
| 2005/0256784 | A1 * | 11/2005 | Uemura et al. ................. 705/26 |

FOREIGN PATENT DOCUMENTS

| JP | 2002-175473 | 6/2002 |
| JP | A-2002-342741 | 11/2002 |
| JP | 2003-330767 | 11/2003 |
| JP | 2004-227431 | 8/2004 |
| JP | 2005-011152 | 1/2005 |
| JP | 2008-052434 | 3/2008 |

OTHER PUBLICATIONS

Japanese Office Action mailed Oct. 23, 2012 in Japanese Patent Application No. 2008-213058 (with translation).

* cited by examiner

*Primary Examiner* — Jeffrey Pwu
*Assistant Examiner* — Samuel Ambaye
(74) *Attorney, Agent, or Firm* — Oliff & Berridge, PLC

(57) ABSTRACT

The electronic album providing system, with which publishing and viewing of an electronic album by a system user is possible, includes: a first decision unit that detects whether or not a designated reader who has been designated by a publisher has viewed the album, and that decides that a first condition has become valid when a number of persons who have completed viewing to a total number of the designated readers reaches a predetermined value; a second decision unit that decides that a second condition has become valid when a time limit for publishing the album that has been set in advance arrives; and a deletion unit that performs deletion control of the album when at least one of the first condition and the second condition becomes valid.

16 Claims, 9 Drawing Sheets

ALBUM A IS DISPLAYED

TO FIG. 7A

CASE A

CASE B

CASE C

ELECTRONIC ALBUM PROVIDING SYSTEM AND FILE PROVIDING SYSTEM

INCORPORATION BY REFERENCE

The disclosures of the following priority applications are herein incorporated by reference: Japanese Patent Application No. 2007-235157 filed Sep. 11, 2007; and Japanese Patent Application No. 2008-213058 filed Aug. 21, 2008.

BACKGROUND OF THE INVENTION

1. Field of the Invention

The present invention relates to a system that provides an electronic album (an on-line album) or a file, and in particular relates to one that deletes an album or a file that has been registered.

2. Description of Related Art

Normally, an album that has been registered upon an electronic album site can be deleted manually by the user who registered it (i.e. by the publisher), but there are some publishers who are lazy and neglect this deletion procedure for a long period of time. When an album is not deleted and is left over a long time, then the storage region of the server for the electronic album site uselessly continues to be used, and not only is this a burden from the point of view of the server, but also it has the disadvantage, from the point of view of the user, that the searchability of the albums decreases. Thus, an album deletion method has been proposed (for example, refer to Japanese Laid-Open Patent Publication 2002-342741) in which an album that has been registered by this publisher is deleted unconditionally if a publisher does not log in to an album site for a predetermined period of time, or in which an album that has not been accessed for a predetermined period of time is deleted.

SUMMARY OF THE INVENTION

However, with the above described prior art method, if a publisher does not delete an album himself although he accesses the album site now and then, or if it is the case that readers continue to access the album, then that album never comes to be deleted, no matter how much time elapses. This problem is not only present with an electronic album providing system, but is also present with a system that provides files of some other type.

According to a first aspect of the present invention, the electronic album providing system with which publishing and viewing of an electronic album by a system user is possible, includes: a first decision unit that detects whether or not a designated reader who has been designated by a publisher has viewed the album, and that decides that a first condition has become valid when a number of persons who have completed viewing to a total number of the designated readers reaches a predetermined value; a second decision unit that decides that a second condition has become valid when a time limit for publishing the album that has been set in advance arrives; and a deletion unit that performs deletion control of the album when at least one of the first condition and the second condition becomes valid.

According to a second aspect of the present invention, the electronic album providing system with which publishing and viewing of an electronic album by a system user is possible, includes: a first decision unit that detects whether or not a designated reader who has been designated by the publisher has viewed the album, and that decides that a first condition has become valid when a number of persons who have completed viewing to a total number of the designated readers reaches a predetermined value; a second decision unit that decides that a second condition has become valid when a predetermined album publishing period elapses; a third decision unit that decides that a third condition has become valid when a total number of times that the album has been viewed has reached a predetermined number of times; and a deletion unit that performs deletion control of the album when at least one of the first condition through the third condition becomes valid.

According to a third aspect of the present invention, in the electronic album providing system according to the first aspect, it is desirable that the system further includes a designation cancellation unit that, according to cancellation input by the publisher, cancels the designation of any desired reader who has been temporarily designated.

According to a fourth aspect of the present invention, in the electronic album providing system according to the first aspect, it is desirable that in the deletion control, the deletion unit asks the publisher whether or not he consents to deletion, and deletes the album if the publisher has consented to its deletion.

According to a fifth aspect of the present invention, in the electronic album providing system according to the first aspect, it is desirable that the first decision unit recognizes an opposite party, to whom the publisher has transmitted an electronic mail inviting him to refer to the album, as being the designated reader.

According to a sixth aspect of the present invention, in the electronic album providing system according to the first aspect, it is desirable that the first decision unit recognizes the designated reader who has performed a predetermined actuation to complete viewing, as being a designated reader who has completed viewing.

According to a seventh aspect of the present invention, it is desirable that the time limit for publishing the album can be set to any desired time by the publisher.

According to an eighth aspect of the present invention, in the electronic album providing system according to the second aspect, it is desirable that the system further includes a designation cancellation unit that, according to cancellation input by the publisher, cancels the designation of any desired reader who has been once designated.

According to a ninth aspect of the present invention, in the electronic album providing system according to the second aspect, it is desirable that in the deletion control, the deletion unit asks the publisher whether or not he consents to deletion, and deletes the album if the publisher has consented to its deletion.

According to a tenth aspect of the present invention, in the electronic album providing system according to the second aspect, it is desirable that the first decision unit recognizes an opposite party, to whom the publisher has transmitted an electronic mail inviting him to refer to the album, as being the designated reader.

According to an eleventh aspect of the present invention, in the electronic album providing system according to the second aspect, it is desirable that the first decision unit recognizes a designated reader who has performed a predetermined actuation to complete viewing, as being a designated reader who has completed viewing.

According to a twelfth aspect of the present invention, in the electronic album providing system according to the second aspect, it is desirable that the time limit for publishing the album can be set to any desired time by the publisher.

According to a thirteenth aspect of the present invention, a file providing system with which publishing and utilization of a file, or of a file group consisting of a plurality of files, by a system user is possible, includes: a first decision unit that detects whether or not a designated user who has been designated by the publisher has utilized the file or the file group, and that decides that a first condition has become valid when a number of persons who have completed utilization to a total number of the designated users reaches a predetermined value; a second decision unit that decides that a second condition has become valid when a time limit that has been set in advance for publishing the file or file group arrives; and a control unit that performs deletion control or movement control of the file or of the file group when at least one of the first condition and the second condition becomes valid.

According to a fourteenth aspect of the present invention, in the electronic album providing system according to the thirteenth aspect, it is desirable that permission/prohibition of deletion or movement is settable for each file in the file group, and in the deletion control or movement control, the control unit does not perform deletion or movement of those files for which prohibition is set.

According to a fifteenth aspect of the present invention, in the electronic album providing system according to the thirteenth aspect, it is desirable that in the deletion control or movement control for a file group for which the second condition has become valid, the control unit does not perform deletion or movement of files for which a period of time from date and time at which the file has been published is shorter than a predetermined period.

According to a sixteenth aspect of the present invention, in the electronic album providing system according to the fifteenth aspect, it is desirable that the control unit deletes files for which the deletion or movement has not been performed, at a point in time at which a period of time from the publication date and time reaches the predetermined period.

DESCRIPTION OF PREFERRED EMBODIMENTS

An embodiment of the present invention will now be described with reference to FIGS. 1 through 7B.

Figure 1:
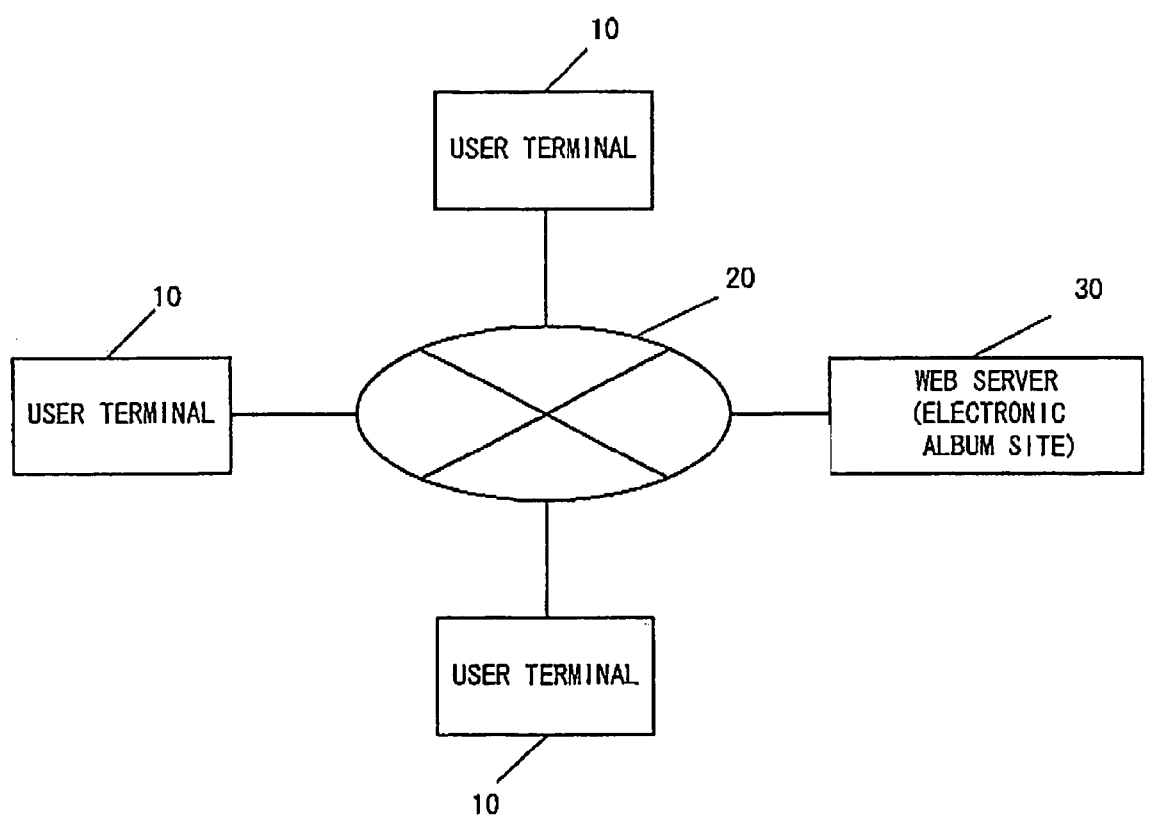
FIG. 1 is a schematic diagram showing an electronic album providing system according to an embodiment of the present invention.
Figure 2:
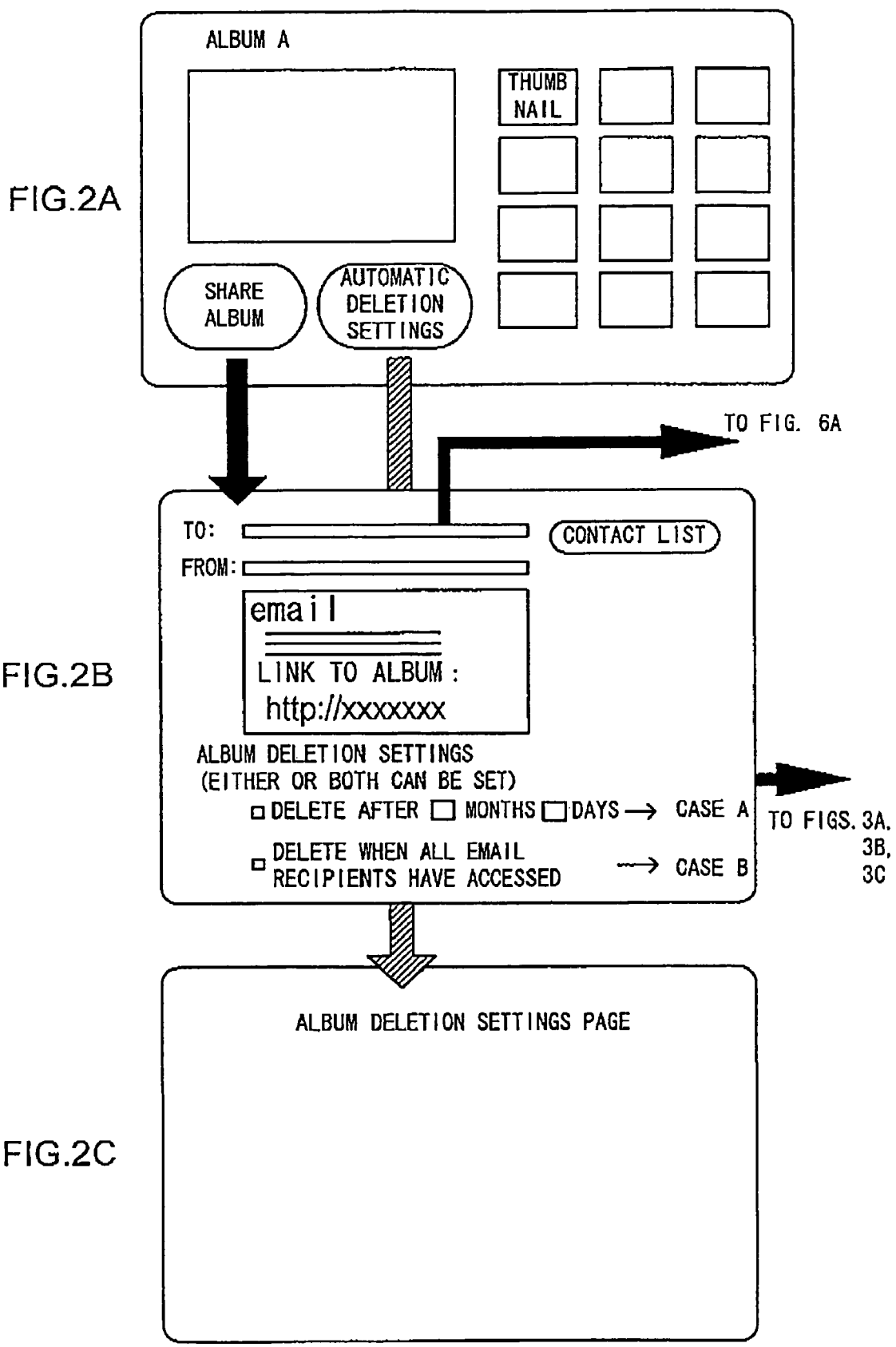
FIGS. 2A through 2C are diagrams showing an album page and a setting page that can be accessed by a publisher.
Figure 3:
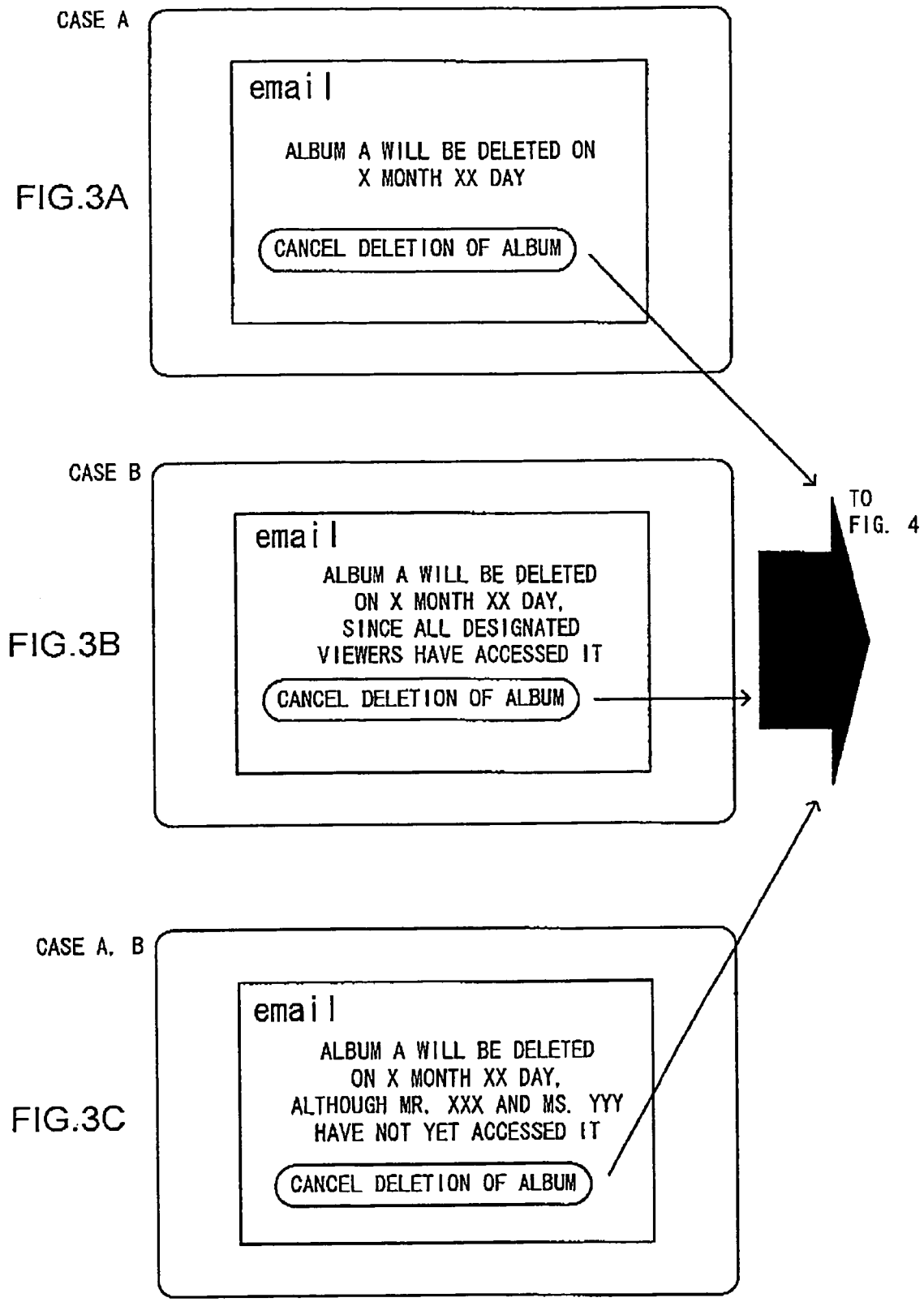
FIGS. 3A through 3C are diagrams showing the contents of electronic mail that is sent to a publisher when an album deletion condition has become valid.
Figure 4:
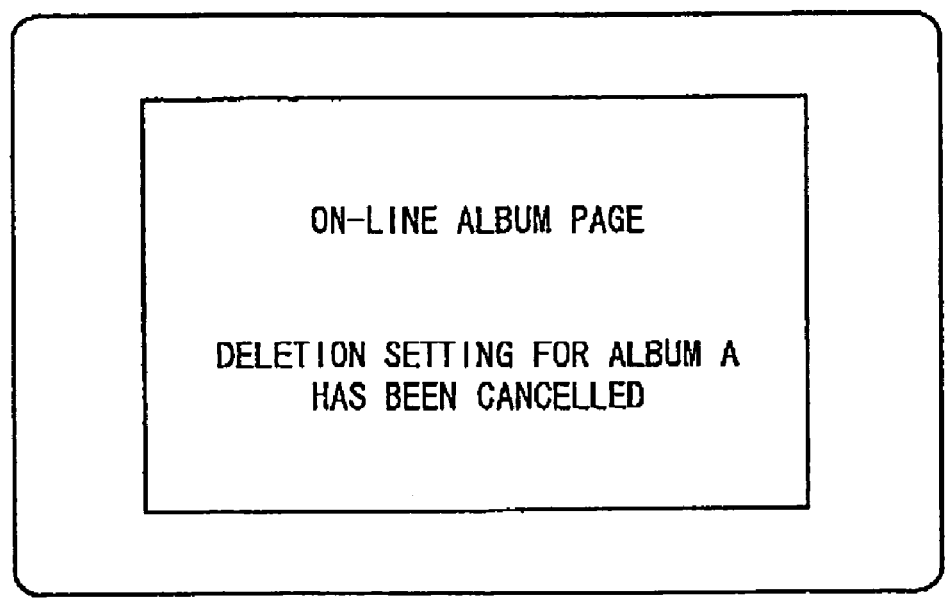
FIG. 4 is a diagram showing an example of a screen that notifies a publisher that the deletion of an album has been cancelled.

FIG. 1 shows the general structure of the electronic album providing system according to this embodiment. The user of this electronic album service accesses the web server 30 of the service provider (i.e. of the album site) via a network 20 from his own terminal 10 (that may be, for example, a personal computer), and can register (i.e. publish) one or more desired images as an album, or can view one or more images in an album that is registered. Normally, an album consists of a plurality of images, and a plurality of albums may be registered. In the following explanation, a service user who registers an album will be termed a publisher, while a service user who is viewing an album will be termed a reader.

It should be understood that the contents included in an album are not limited to being still images; they could also be moving images (i.e. video) or files of some other type, and it would be acceptable for these different types of file to be mixed together.

An example of processing steps by a publisher in relation to an album will now be explained.

A publisher who has registered as a user upon the album site performs the registration of an album by accessing this site and performing a predetermined procedure (individual authentication and so on). The registration of an album may be performed; for example, by the publisher uploading one or more electronic images that he has photographed himself to the server 30 (the detailed steps are here omitted).

FIGS. 2A through 4 show examples of screens that are displayed upon a terminal 10 of a publisher who has accessed the album site.

FIG. 2A shows a screen display for an album (here, an album A) that the publisher has registered this time or in the past, and, on this screen, a plurality of images that make up that album are displayed as thumbnail images. If any one of these thumbnail images is selected, it is possible to check the main image that corresponds thereto. Moreover, buttons "SHARE ALBUM" and "AUTOMATIC DELETION SETTINGS" are displayed upon this screen and the publisher can select either one of these buttons by clicking it.

When the button "SHARE ALBUM" is selected, the display changes over to the screen of FIG. 2B. On this screen, settings for transmitting guidance mail (electronic mail) to a person (or to a plurality of persons) who is/are wanted to see that album, and deletion settings for that album, may be made. This guidance mail transmission function is almost the same as conventional mail software: an input field for the mail address of the opposite party, an input field for one's own mail address, an edit field for the text of the email, and so on, are displayed. In the mail text, a message to the effect that an album or albums have been registered and it is desired for the recipient to view the album or albums, link information for the registered album or albums, and so on are described. Moreover, a dedicated electronic address register for each of the publishers is prepared, and it is possible to register email addresses herein, and to designate the addresses that have been registered as the addresses of addressees. When transmitting an electronic mail message, the server 30 stores this information consisting of the addressees for email transmission in correspondence to this album, and recognizes the readers to whom the mail has been transmitted as "designated readers" who have been designated by the publisher.

It should be understood that the mail account may be an account upon this electronic album site, or an individual email account of the publisher may be used.

On the other hand, in relation to the deletion settings for the album, it is possible to select either or both of Case A: Set the day that the album is to be deleted (the album publishing period), or Case B: Delete after all the designated readers (i.e.

the readers to whom email has been sent) have seen the album. If Case A has been selected, then it is also possible to set after what month and what day the album is to be deleted. If both Cases A and B are selected, then this means that the album will be deleted when the condition for either Case A or Case B becomes valid. It should be understood that, if "AUTOMATIC DELETION SETTINGS" is selected in FIG. 2A, then only the above described deletion settings are made upon a different screen (FIG. 2C).

Next, the album deletion decision control by the server 30 will be explained with reference to the flowchart of FIG. 5.

Figure 5:
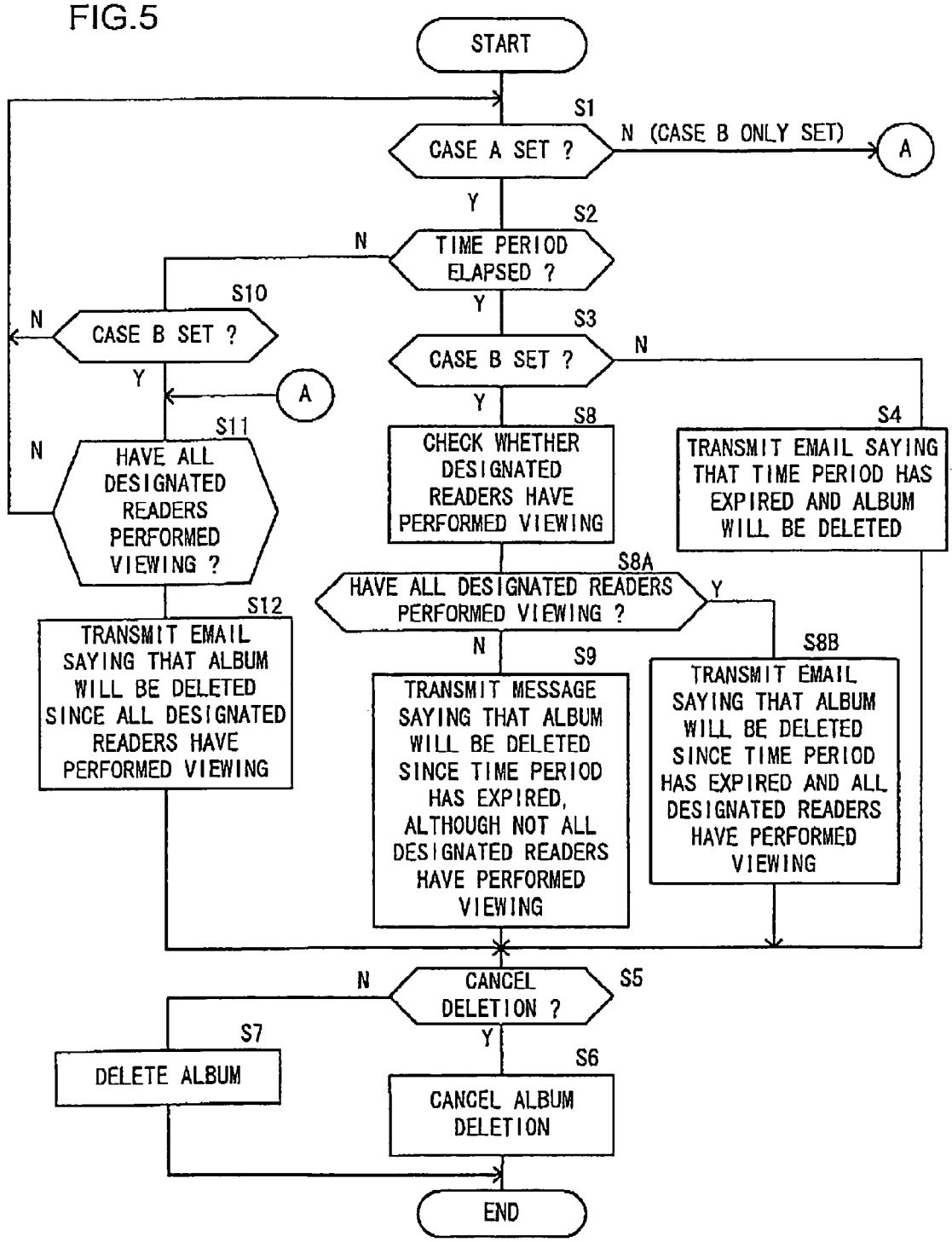
FIG. 5 is a flowchart showing the steps of album deletion control by a server.

FIG. 5 shows an example of the processing sequence of a program that is installed upon the server 30, and that is executed when at least one of the Cases A and B described above is set. In a step S1, a decision is made as to whether or not the Case A described above is set. If the result of this decision is affirmative, then the flow of control proceeds to a step S2, in which a decision is made as to whether or not the period for publication of the album has elapsed. If the designated day for deletion of the album has arrived, or if a predetermined day that is some day(s) before the deletion day has arrived, then the decision in this step S2 is affirmative If the decision in this step S2 is affirmative, then the flow of control proceeds to a step S3, in which a decision is made as to whether the Case B is set. If the Case B is not set, in other words if there is set only the Case A, then the flow of control proceeds to a step S4 if this deletion condition is satisfied.

Here, although it is acceptable, if the publisher makes the deletion settings described above, to delete the corresponding album when the deletion condition that has been set becomes valid, it is more desirable to check with the publisher before performing this deletion. Thus, in the step S4, an electronic mail is transmitted to the publisher with contents such as shown in FIG. 3A. In this email, along with specifying the date that the album will be deleted, a cancel button (i.e. a link) is provided for canceling this deletion.

Upon receipt of this electronic mail, the publisher realizes that this album will soon be deleted, and he clicks the cancel button described above if he desires to cancel the deletion. When he does so, the display changes to a predetermined on-line album page, and the server 30 that maintains this recognizes that a command has been issued for preventing deletion of the album in question (i.e. the result of the decision in the step S5 of FIG. 5 is affirmative). In a step S6, the server 30 cancels the deletion setting for that album, and also displays a message to the effect that the deletion has been cancelled (refer to FIG. 4). Due to the deletion settings being cancelled, this album is no longer scheduled for deletion, and will not be deleted.

On the other hand, if the publisher has performed actuation upon the screen of FIG. 3A to perform deletion, or if actuation of the cancel button has not been confirmed although a predetermined time period has elapsed from the transmission of the above email, then the result of the decision in the step S5 is negative, and the albumin question is deleted in a step S7.

Furthermore, if the setting of the Case B has been confirmed in the step S3 of FIG. 5, then the flow of control proceeds to a step S8. In this step S8 a check is made as to whether or not viewing by the designated readers has been performed (the method for this checking will be described hereinafter), and then in a step S8A a decision is made as to whether or not all the designated readers have performed viewing. If the result of the decision in the step S8A is negative, in other words if both the Cases A and B are set and moreover only the deletion condition for the Case A is satisfied, then the flow of control proceeds to a step S9. In this step S9 and electronic mail such as that shown in FIG. 3C, for example, is transmitted to the publisher, and then the flow of control is transferred to the step S5. This electronic mail is also provided with a cancel button for canceling the deletion. It should be understood that although, with the message shown in FIG. 3C, it is possible to understand from the contents who has not viewed the album, this need not necessarily be the case. It would also be acceptable to issue a notification that the album will be deleted even though there exists some designated reader who has not yet viewed it.

If the result of the decision in the step S8A is affirmative, in other words, if both of the deletion conditions for the Cases A and B are satisfied, then in a step S8B, an electronic mail is transmitted to the publisher to the effect that the album will be deleted since the time period has elapsed and moreover all of the designated viewers have viewed the album, and then the flow of control is transferred to the step S5. A cancel button for canceling the deletion is included in this email as well.

Moreover, if the result of the decision in the step S2 is negative, then the flow of control is transferred to a step S10, in which a decision is made as to whether or not the Case B has been set. If the Case B has not been set, then the flow of control returns back to the step S1, while if the Case B is set, then the flow of control proceeds to a step S1. In this step S11, a decision is made as to whether or not all of the designated readers have viewed this album, and if the result is negative, then the flow of control returns to the step S1, whereas if it is affirmative then the flow of control proceeds to a step S12. An affirmative decision in the step S11 means that both the Cases A and B are set, and moreover that the situation is that only the deletion condition for the Case B is satisfied. Thus, in the step S12, an electronic mail (for example one such as shown in FIG. 3B) is transmitted to the publisher to the effect that the album will be deleted since all the designated readers have viewed it, and then the flow of control is transferred to the step S5. A cancel button for canceling the deletion is included in this email as well.

Moreover, if the result of the decision in the step S1 is negative, in other words, if there is set only the Case B, the flow of control is also transferred to the step S11.

It should be understood that the publisher can manually delete an album that he himself has registered at any time, irrespective of what deletion settings have been made on the screen of FIG. 2B.

As has been described above, with this embodiment, setting both of the Cases A and B described above as album deletion conditions enables the album in question to be deleted either upon the day set by the publisher for album deletion, or when all of the readers designated by the publisher have looked at the album. Accordingly, even if the publisher is too lazy to delete the album manually, and even if the state continues in which some readers are accessing the album, still the album does not continue to be present upon the server 30 over a long time period. Accordingly, along with alleviating the burden upon the server, it is also possible to mitigate a decrease in searchability of the albums upon the server from the point of view of the user.

Furthermore it is possible to contemplate enhancement of the convenience for the publisher, since the album is not deleted directly when the conditions for deletion become valid, but rather it is arranged to check with the publisher first. For example, in the situation in which some designated reader whom the publisher absolutely wants to look at the album has not yet done so, he may take the measure of asking that designated reader to look at the album quickly. Thereafter, the publisher may set the album deletion settings over again.

Figure 6A:
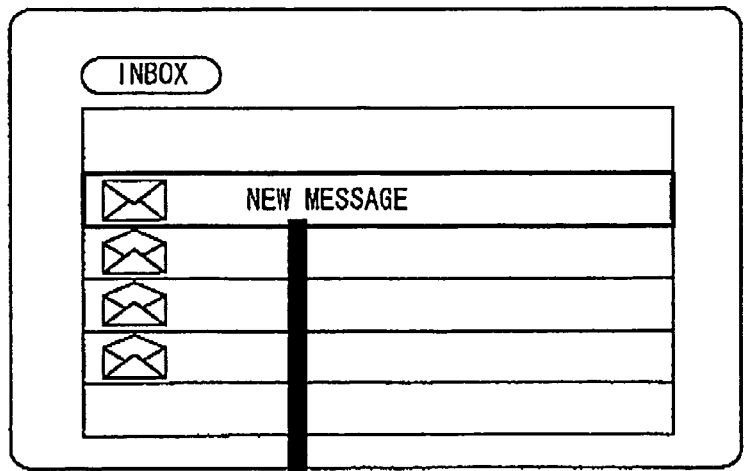
FIGS. 6A through 6C are diagrams for explaining to a designated reader how to access an album and to input information that he has completed viewing it.
Figure 6B:
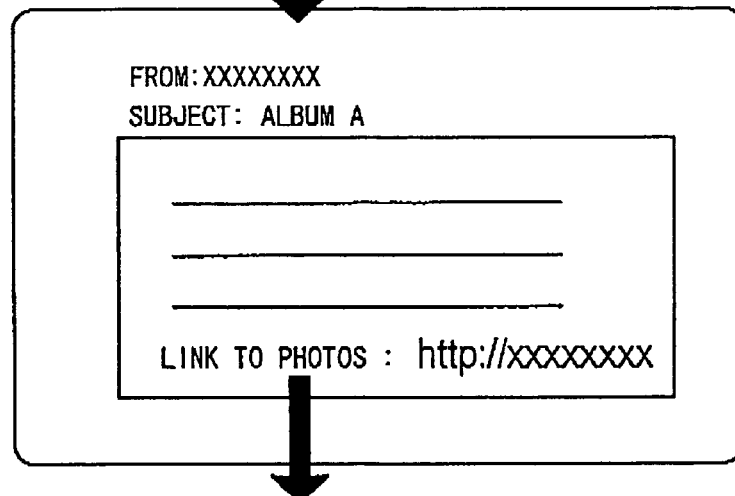

Next, the operations performed by a reader will be explained with reference to FIGS. 6A through 6C.

A designated reader receives the guidance email (FIG. 6A) that has been transmitted with the screen of FIG. 2B, and reads the contents thereof, thus being informed that the publisher has registered the album. A link to the electronic album is included in this guidance email (see FIG. 6B), and, by clicking on this link, it is possible for the designated reader to open the page for the subject album (in this figure, the album A) directly. On this page, it is possible to view the main image that corresponds to each of the thumbnail images by clicking upon that thumbnail image.

Figure 6C:
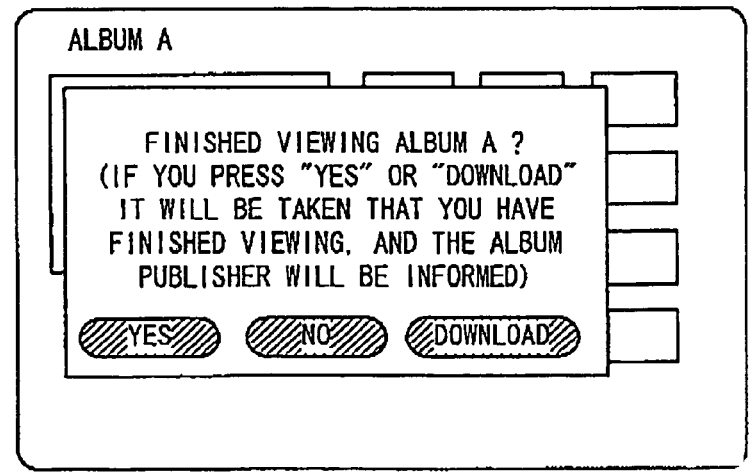

When actuation to close the electronic album is performed (i.e. actuation to close that album page, or to close the entire display window), then a dialog is displayed as shown in FIG. 6C. This is to input information as to whether viewing of the album has been completed, and it is possible to select "YES", "NO", or "DOWNLOAD". If "DOWNLOAD" is selected, then the image or images in the album are downloaded into the terminal of the reader. If "YES" or "DOWNLOAD" has been selected, then information that specifies that viewing has been completed along with information specifying this reader is transmitted to the server 30, whereas, if "NO" has been selected, then the information that viewing has been completed is not transmitted. Thereafter this album page (i.e. its window) is closed.

Figures 7A, 7B:
FIGS. 7A and 7B are figures showing examples of screen for notifying to the publisher of whether or not an album has been viewed by designated readers.

By the actions of the desired readers on the dialog of FIG. 6C described above, the server 30 can ascertain whether any of the designated readers has viewed the album (or not), and, along with performing the processing of the step S8 described above on the basis thereof and making the decision of the step S11, can also notify the publisher of the viewing state of the album. FIGS. 7A and 7B are viewing state checking pages that can be accessed by the publisher, and, on these pages, he is able to check in a list to see whether each of the designated readers has viewed the album or not (see FIG. 7A). Furthermore, with these pages, he is also able to delete any designated reader who has not yet viewed the album (i.e., he is able to cancel the designation of that designated reader). In other words, when the publisher selects some predetermined designated reader from the above described list display and actuates the delete button, then the server 30 deletes the designated reader who has been selected from the above described list display. FIG. 7B shows an example of the deletion of a designated reader yyyyyyy. At the same time, the server 30 eliminates the designated reader who has been deleted from the list of the designated readers that was initially stored. Whether or not the person who has been removed from the list views the album, no longer exerts any influence upon the decision as to whether or not to delete the album.

Now, according to the album settings established by the publisher, not only the designated readers but also general users (non-designated readers) who have not received any guidance email can view the album. In the case of this setting, in the decision described above as to deletion of the album, the server 30 does not give any consideration as to whether or not a non-designated reader has viewed the album. In other words, whether or not the album is to be deleted is determined exclusively according to whether or not the designated readers have viewed the album.

In order to distinguish whether a reader is a designated reader or a non-designated reader, it will be sufficient to change the address when accessing this album site. For example, suppose that the album is at the address "www.xxx/123". A non-designated reader accesses the album by clicking upon the link "www.xxx/123" contained in some page. On the other hand, the link in the guidance email described above that is sent to a designated reader is the address "www.xxx/123/abc" with "abc" appended to it, so that that designated reader accesses the album via this address. Unless access has been performed using the address with "abc" appended, the server 30 performs action to close the album, and also displays the dialog shown in FIG. 5C. According to this, whether or not a non-designated reader views the album, does not exert any influence upon the deletion control.

It should be understood that the plurality of designated readers who have been chosen by the publisher may include both of persons who are absolutely desired to view the album, and of persons who are not in this category. In this type of case, it is considered that a function of changing over, by a simple operation, the address of the album described in the guidance email between the above described one with "abc" appended to it, and one without "abc" appended to it, may be added to the program of the server 30.

Although, in the above, in relation to the deletion settings for an album, the two types of option of Cases A and B are provided, it would also be acceptable to have in addition, as a Case C, "Delete when the number of times the album has been viewed reaches a predetermined number of times" (that can be set by the publisher). The meaning of this Case C is that this album is deleted irrespective of whether the viewers of the album are designated readers or non-designated readers, if the number of times that this album has been viewed (i.e. the number of times that this album has been accessed) reaches the predetermined number of times. In the situation in which all of Cases A, B, and C have been set, the album is deleted when any one of these conditions is satisfied. As in the case of the previous embodiment, it would also be acceptable to arrange to check with the publisher in advance, and to perform deletion of the album if the publisher has consented to such deletion.

It should be understood that while, in the above, it is arranged for the condition of Case B to be satisfied when all of the designated readers have viewed the album, in other words when the proportion of the number of persons who have completed viewing has attained 100%, it would also be acceptable for this proportion to be less than 100% (for example, 80% or 90% or the like).

Although the special case of an electronic album has been described above, the present invention can also be applied to a system that supplies files in general. In this case, the method for using the service is the same as in the case of the electronic album described above, and also the details of the processing by the server program are substantially the same as in the case of FIG. 5. In other words, the file publisher registers (i.e. publishes) a file by pursuing a predetermined procedure for accessing the server, while the user of the file can utilize a file that has been published. "Utilizing" a file is a concept that includes operations such as displaying, inspection, viewing, or program execution that are implemented by a so called "open" command for the file, or downloading the file.

With regard to the registration of the files, it is possible to register each of the files individually, and it is also possible to register a plurality of the files all together as a single group of files (for example, as a folder, a directory, or the like). The publisher can also add a new file to a file group that he has already registered in the past. It should be understood that the above described electronic albums correspond to file groups, from the point of view that they are collections of a plurality of image files.

As far as the types of the files are concerned, they may include any of image files, moving image (i.e. video) files, music files, document files, program files, or the like; and, in a group of files, it would also be acceptable for files of a plurality of different types to be mixed together.

The server of the file providing system is provided upon a large scale network such as the internet or the like or upon a small scale network such as an in-company network, and the file publisher and the users access this server via the network from their own terminals 10.

In this case as well, the file publisher can transmit guidance email to a person who is wanted by the publisher to utilize the files, and can establish file deletion settings. In such a guidance email, there are specified link information and so on for the file (or file group) registered location, and, when this is to be transmitted, the server 50 establishes and stores a correspondence of the information about the transmission destinee and that file, and recognizes the user who is the mail transmission destinee as being a user who has been designated by the publisher, i.e. as a "designated user".

With regard to the file deletion settings, it is possible to select either or both of Case A: Set the day that the file is to be deleted (the file publishing time limit), or Case B: Delete after all the designated users have utilized the file, for each file that does not belong to a file group, for each file group, or for each file within a file group.

Figure 8A:
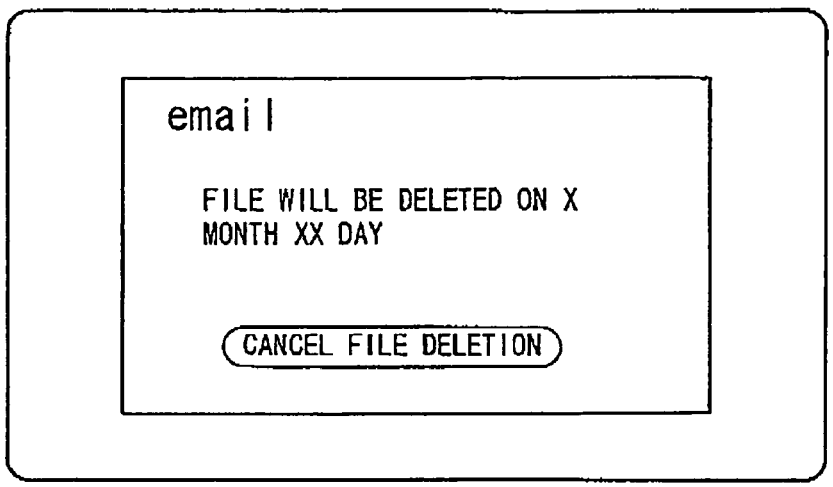
FIGS. 8A through 8C are diagrams showing the contents of electronic mail that is sent to a publisher when a file deletion condition has become valid.
Figure 8B:
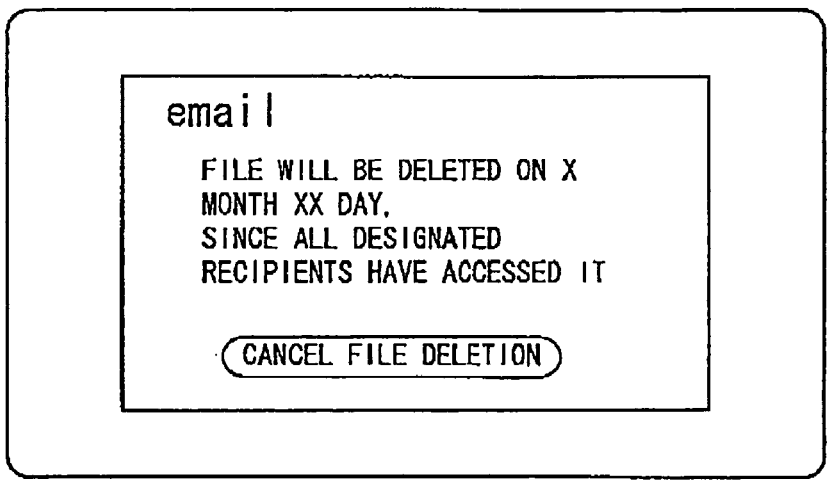
Figure 8C:
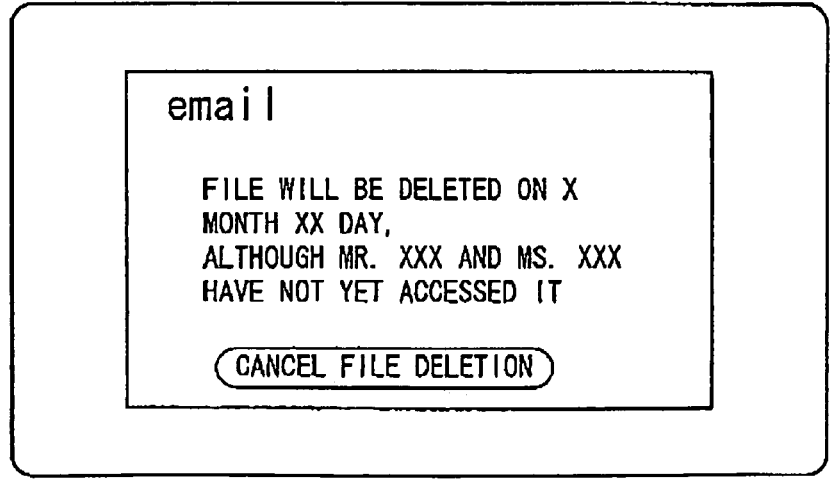
Figure 9:
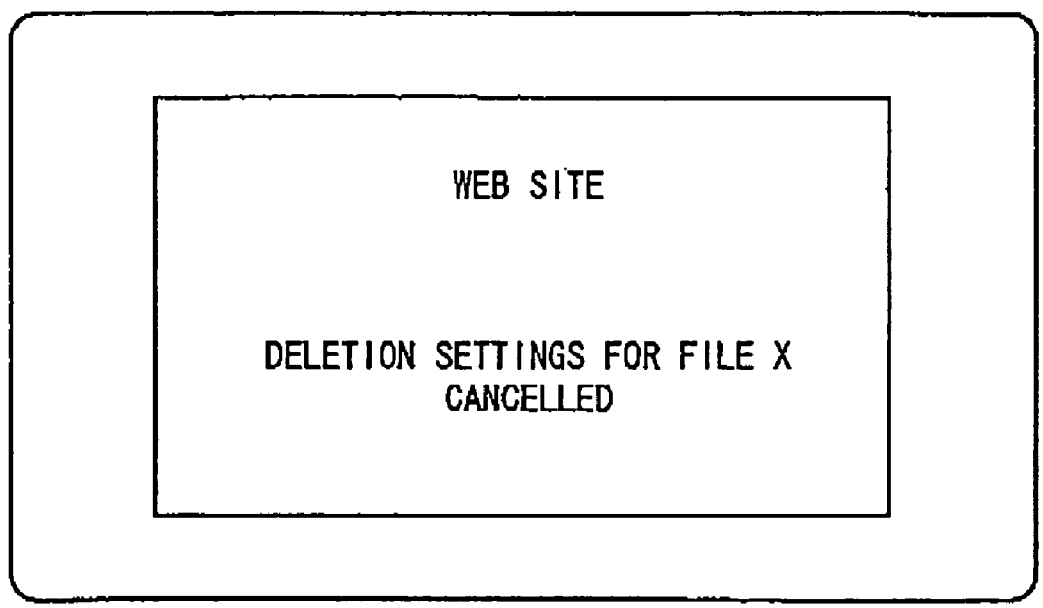
FIG. 9 is a figure showing an example of a screen that notifies a publisher of the cancellation of deletion of a file.

If both the cases A and B are set, then this means that the file (or the file group) will be deleted when either the day for file deletion has been designated by the publisher arrives, or all of the designated users that have been designated by the publisher have utilized the file. In this case as well, the file is not deleted immediately that the condition becomes valid; it is desirable to arrange to check with the publisher. FIGS. 8A through 8C show the contents of electronic mails that are sent to the publisher when file deletion conditions have become valid; FIG. 8A is for when the condition of the Case A becomes valid, FIG. 8B is for when the condition of the case B becomes valid, and FIG. 5C is for when the file will be deleted because the condition of Case A has become valid although the condition of the case B has not become valid. In each of these emails, there is included a button for canceling the deletion of the file, and if that button is pressed, then the file is not deleted. If the publisher performs actuation so as to perform deletion of the file, or if actuation of the cancel button is not confirmed even though a predetermined time period has elapsed from when the email was sent, then the file or file group in question is deleted. FIG. 9 shows a screen that notifies the publisher that the deletion of the file has been cancelled.

A designated user receives the guidance email described above and reads the contents thereof, thus being informed that the publisher has registered the file. A link is included in this guidance email, and, by clicking on this link, the page for the subject file opens directly. On this file publishing page, there are displayed an icon and a file name and so on that describe the file that has been published. In the case of a file group, icons and so on are displayed for all of the files that have been published. The designated user is able to utilize these files. When actuation to close the file publication page is performed, a dialog is displayed for inputting whether or not utilization of the file has been completed, and it is possible for the user to select "YES" or "NO". If he selects "YES" then information that utilization has been completed is transmitted to the server, and due to this the server is able to recognize whether or not each designated user has utilized the file. The dialog described above may be arranged such that it is possible to select a button "DOWNLOAD" therein in a similar manner to that described above.

An example has been shown in which, in the above manner, a designated user reports that he has utilized a file or not, and the server decides that the file has been utilized or not on the basis thereof; but it would also be acceptable to arrange to decide, for example, that the file has been "utilized", if a designated user has actually utilized that file, or has actually utilized at least one file in that file group. This is the same with the electronic album providing system described above as well. For example, it would also be acceptable to arrange to decide that an album has been "viewed", if at least one image file included in the album has been opened.

It would also be acceptable to provide a page upon which each designated user can confirm upon a list whether or not he has utilized the file, and it would also be acceptable to arrange for it to be possible to delete, from that page, a designated user who has not yet utilized the file (i.e. to cancel the designation of a designated user). Moreover, if a setting is established so that a non-designated user who has not received a guidance email can also utilize the file, then it may be arranged for the server not to give any consideration, in the decision for deletion of the file, to whether or not the file has been utilized by such a non-designated user. For the distinction between a designated user and a non-designated user, the address when accessing the file supply page may be varied.

According to the file providing system described above, even if the publisher is too lazy to delete the file manually, and even if the state continues in which some readers are accessing the file, still the file does not continue to be present upon the server 30 over a long time period. Accordingly, along with alleviating the burden upon the server, it is also possible to mitigate a decrease in searchability of the files upon the server from the point of view of the user.

Since, as described above, it is possible to subsequently add a file to a file group, accordingly files of different publishing dates are mixed together within a single file group, and the situation may occur in which it is desired still to leave the new files remaining although it may be acceptable to arrange to delete the old files among them. Thus it would be acceptable, if the condition of the Case A becomes valid for this type of file group, and if moreover the publisher does not cancel its deletion, to arrange not to delete the file group itself, but to delete only those files among the files in the file group (the old files), whose publishing periods are greater than or equal to a predetermined period. In this case, those files whose periods from the date and time of publishing are shorter than the predetermined period are left remaining. If only old files are present, then deletion is performed for the whole file group, in a similar manner to that described above. The files that remain and are not deleted at this time are sequentially deleted at the subsequent time points that their publishing periods become greater than or equal to the predetermined period.

It should be understood that, although an example has been shown in which the files are deleted when the condition therefor becomes valid, it would also be acceptable to move the files instead of deleting them. For example, it may be considered to move the files from the main storage medium that is used by the file providing system, to a storage medium for storage of files that are not normally used. The storage medium to which this movement is performed may also be on some other server. It is desirable to make it possible again to utilize the data that has been moved by following some type of procedure. Moreover, it is desirable to ensure that the files are automatically deleted, after a predetermined time period has elapsed from when they have been moved.

Although, in the above, in relation to the deletion settings for an album, the two types of option of Cases A and B are provided, it would also be acceptable to have in addition, as Case C, "Delete when the number of times the file has been utilized reaches a predetermined number of times" (that can be set by the publisher). The meaning of the Case C is that the file is deleted irrespective of whether the users of the file are designated users or non-designated users if the number of times that this file has been utilized (i.e. the number of times that the page upon which this file has been published has been accessed) reaches the predetermined number of times. In the situation in which all of the Cases A, B, and C have been set, the file is deleted when any one of these conditions is satisfied. It would also be acceptable to arrange to check with the publisher in advance, and to perform deletion of the file if the publisher has consented to such deletion.

It should be understood that while, in the above, it is arranged for the condition of Case B to be satisfied when all of the designated readers have utilized the file, in other words, when the proportion of the number of persons who have completed utilization has attained 100%. However, it would also be acceptable for this proportion to be less than 100% (for example, 80% or 90% or the like).

Thus, according to the embodiments described above, it is possible to prevent albums or files from remaining upon a system over a long period of time.

The embodiments described above are examples, and various modifications can be made without departing from the scope of the invention.

What is claimed is:

1. An electronic album providing system with which publishing and viewing of an electronic album by a system user is possible, the system comprising:
   a designation unit that designates readers who are allowed to view the electronic album in response to designation input by a publisher who has uploaded the electronic album to the electronic album providing system;
   a first decision unit that detects whether or not the designated readers designated by the designation unit have completed viewing of the album and counts the designated readers who are detected to have completed viewing of the album, and that decides that a first condition has become valid when a proportion of a total number of the designated readers who have completed viewing of the album to a total number of the designated readers reaches a predetermined value;
   a second decision unit that decides that a second condition has become valid when a time limit for publishing the album that has been set in advance arrives; and
   a deletion unit that performs deletion control of the album when at least one of the first condition and the second condition becomes valid.

2. An electronic album providing system with which publishing and viewing of an electronic album by a system user is possible, the system comprising:
   a designation unit that designates readers who are allowed to view the electronic album in response to designation input by a publisher who has uploaded the electronic album to the electronic album providing system;
   a first decision unit that detects whether or not the designated readers designated by the designation unit have completed viewing of the album and counts a number of the designated readers who are detected to have completed viewing of the album, and that decides that a first condition has become valid when a proportion of a total number of the designated readers who have completed viewing of the album to a total number of the designated readers reaches a predetermined value;
   a second decision unit that decides that a second condition has become valid when a predetermined album publishing period during which the album is accessible by the designated readers elapses;
   a third decision unit that decides that a third condition has become valid when a total number of times that viewing of the album has been completed has reached a predetermined number of times; and
   a deletion unit that performs deletion control of the album when at least one of the first condition through the third condition becomes valid.

3. An electronic album providing system according to claim 1, further comprising:
   a designation cancellation unit that, according to cancellation input by the publisher, cancels the designation of any desired reader who has been designated by the designation unit.

4. An electronic album providing system according to claim 1, wherein
   in the deletion control, the deletion unit asks the publisher whether or not he consents to deletion of the album, and deletes the album if the publisher has consented to its deletion.

5. An electronic album providing system according to claim 1, wherein
   the first decision unit recognizes an opposite party, to whom the publisher has transmitted an electronic mail inviting him to refer to the album, as being the designated reader.

6. An electronic album providing system according to claim 1, wherein
   the first decision unit recognizes the designated reader who has performed a predetermined actuation to complete viewing of the album, as being a designated reader who has completed viewing.

7. An electronic album providing system according to claim 1, wherein
   the time limit for publishing the album can be set to any desired time by the publisher.

8. An electronic album providing system according to claim 2, further comprising:
   a designation cancellation unit that, according to cancellation input by the publisher, cancels the designation of any desired reader who has been designated by the designation unit.

9. An electronic album providing system according to claim 2, wherein
   in the deletion control, the deletion unit asks the publisher whether or not he consents to deletion of the album, and deletes the album if the publisher has consented to its deletion.

10. An electronic album providing system according to claim 2, wherein
    the first decision unit recognizes an opposite party, to whom the publisher has transmitted an electronic mail inviting him to refer to the album, as being the designated reader.

11. An electronic album providing system according to claim 2, wherein
    the first decision unit recognizes a designated reader who has performed a predetermined actuation to complete viewing, as being a designated reader who has completed viewing.

12. An electronic album providing system according to claim 2, wherein
    the time period for publishing the album can be set to any desired time by the publisher.

13. A file providing system with which publishing and utilization of a file, or of a file group consisting of a plurality of files, by a system user is possible, the system comprising:
    a designation unit that designates a user who is allowed to use the file or the file group in response to designation input by a publisher who has uploaded the file or the group to the file providing system;

a first decision unit that detects whether or not the designated user designated by the designation unit has utilized the file or the file group, and that decides that a first condition has become valid when a proportion of an integration number of the designated users who have completed utilization to a total number of the designated users reaches a predetermined value;

a second decision unit that decides that a second condition has become valid when a time limit that has been set in advance for publishing the file or file group arrives; and a control unit that performs deletion control or movement control of the file or of the file group when at least one of the first condition and the second condition becomes valid.

14. A file providing system according to claim 13, wherein permission/prohibition of deletion or movement is settable for each file in the file group, and in the deletion control or movement control, the control unit does not perform deletion or movement of those files for which prohibition is set.

15. A file providing system according to claim 13, wherein in the deletion control or movement control for a file group for which the second condition has become valid, the control unit does not perform deletion or movement of files for which a period of time from date and time at which the file has been published is shorter than a predetermined period.

16. A file providing system according to claim 15, wherein the control unit deletes files for which the deletion or movement has not been performed, at a point in time at which a period of time from the publication date and time reaches the predetermined period.

* * * * *